(12) United States Patent
Suzuki (10) Patent No.: US 6,212,440 B1
(45) Date of Patent: Apr. 3, 2001

(54) NUMERICAL CONTROL SYSTEM (75) Inventor: Tomohiro Suzuki, Niwa-gun (JP)

(73) Assignee: Okuma Corporation, Nágoya (JP)

( * ) Notice: Subject to any disclaimer, the term of this patent is extended or adjusted under 35 U.S.C. 154(b) by 0 days.

(21) Appl. No.: 09/132,700

(22) Filed: Aug. 12, 1998

(30) Foreign Application Priority Data

Aug. 21, 1997 (JP) .................................................. 9-224856

(51) Int. Cl.$^7$ .................................................. G05B 19/18
(52) U.S. Cl. .............................. 700/87; 700/86; 700/181
(58) Field of Search .............................. 700/83, 17, 18, 700/86, 87, 180, 181

(56) References Cited

U.S. PATENT DOCUMENTS

| | | | |
|---|---|---|---|
| 4,281,379 | * | 7/1981 | Austin ....................................... 700/3 |
| 5,465,215 | * | 11/1995 | Strickland et al. ................... 700/180 |
| 5,737,560 | * | 4/1998 | Yohanan ............................... 345/349 |
| 6,085,224 | * | 7/2000 | Wagner ................................. 709/203 |

* cited by examiner

Primary Examiner—William Grant
Assistant Examiner—Paul Rodriguez
(74) Attorney, Agent, or Firm—Oliff & Berridge, PLC (57) ABSTRACT

With only specification of numerical control information to be used for machining when an operator uses a machining tool equipped with a numerical control system, optimum display and functions can be realized to meet various machining situations. In the system, after a command specifying hypertext has been analyzed by a numerical control information analysis section, the contents of the command is transmitted to a hypertext specifying section where the hypertext itself is specified. In the meantime, after having been analyzed by the numerical control information analysis section, a command designating the displaying or execution of the specified hypertext is designated by a browser-function executing section to execute various processes described in the hypertext specified by the hypertext specifying section.

14 Claims, 11 Drawing Sheets

```
O1000
VBROW1=0 ································································································· A
(VBROW1 0:METRIC 1:INCH)
URL="file:///fixed-cycle.htm" ···························································· B
BROWSE ·································································································· C
M0
VC1=VBROW1  (CYCLE TYPE)
VC2=VBROW2  (X)
VC3=VBROW3  (Y)
VC4=VBROW4  (Z)
VC5=VBROW5  (S)                              ·············································· D
VC6=VBROW6  (F)
VC7=VBROW7  (I, Q)
VC8=VBROW8  (J)
G0Z200.
X120. Y120.
M63
M6
T1
G15H1
S=VC5
M3
G0X0. Y0.
M8
G56Z0.125H1001
M54
IF [VC1 EQ 1] GOTO NA01
IF [VC1 EQ 2] GOTO NA02
IF [VC1 EQ 3] GOTO NA03
IF [VC1 EQ 4] GOTO NA04
GOTO NA10
NA01 G73 X=VC2 Y=VC3 Z=VC4 R0.12 Q=VC7 P6 F=VC6
GOTO NA10
NA02 G81 X=VC2 Y=VC3 Z=VC4 R0.12 P6 F=VC6
GOTO NA10
NA03 G83 X=VC2 Y=VC3 Z=VC4 R0.12 I=VC7 J=VC8 P6 F=VC6
GOTO NA10
NA04 G85 X=VC2 Y=VC3 Z=VC4 R0.12 P6 F=VC6
NA10 G0Z200.
X120. Y120.
M6
M2
```

Fig.5

Content of fixed-cycle.htm
<HEAD>
<TITLE>Automatic Setting of Fixed Cycle</TITLE>
<SCRIPT>
functioncalc (frm) {
　　·
　　·
Omitted (Determine Data of Fixe Cycle in This, Transfer Data to NC Program)
　　·
　　·
}
</SCRIPT>
</HEAD>
<BODY>
<FORMMETHOD= "post">
<CENTER><H2>WILL AUTOMATICALLY DETERMINE BORING METHOD. SET DATA. </H2></CENTER><P>
BORE DEPTH　　:<INPUT NAME= "form1" VALUE= " " SIZE= "10" >
TOOL DIAMETER:<INPUT NAME= "form2" VALUE= " " SIZE= "8" >
X:<INPUT NAME= "form3" VALUE= " " SIZE= "10" >
Y:<INPUT NAME= "form4" VALUE= " " SIZE= "10" >
<P>MATERIAL SUBSTANCE
　S45C:<INPUT TYPE= "radio" NAME= "radio1" CHECKED>
　FC25:<INPUT TYPE= "radio" NAME= "radio1" >
　AL:<INPUT TYPE= "radio" NAME= "radio1" >
<P>TOOL SUBSTANCE
　HSS<INPUT TYPE= "radio" NAME "radio2" CHECKED>
　UHS<INPUT TYPE= "radio" NAME= "radio2" >
<P>TOOL KIND
　CENTER<INPUT TYPE= "radio" NAME= "radio3" >
　DRILL<INPUT TYPE= "radio" NAME= "radio3" CHECKED>
　END MILL<INPUT TYPE= "radio" NAME= "radio3" ><BR>
　REAMER<INPUT TYPE= "radio" NAME= "radio3" >
　BORING<INPUT TYPE= "radio" NAME= "radio3" >
<CENTER><H2>PRESS BUTTON [CALC] THEN WILL AUTOMATICALLY DETERMINE TO REFLECT ON NC PROGRAM
<H2></CENTER><P>
<INPUT TYPE= "button" VALUE= "CALC" onClick=calc (this. form)><P>
FIXED CYCLE:<INPUT NAME= "form3" VALUE= " " SIZE= "10" >
NUMBER OF ROTAIONS:<INPUT NAME= "form4" VALUE= " " SIZE= "10" >
FEED SPEED:<INPUT NAME= "form5" VALUE= " " SIZE= "10" ><BR>
STEP I (Q):<INPUT NAME= "form6" VALUE= " " SIZE= "10" >
STEP J:<INPUT NAME= "form7" VALUE= " " SIZE= "10" <P>
</FORM>
</BODY>

```
O1000
DEF WWW NAME = "CHECK_SIZE"
<HEAD>
<TITLE>Confirm Dimensions</TITLE>
</HEAD>
<BODY>
<CENTER>
<H1>FIRST-STEP MACHINING COMPLETED.
CONFIRM MACHINING DIMENSIONS WITH
 REFERENCE TO DIAGRAM BELOW. </H1><P>
<IMG SRC= "check_size.gif">
W=200mm (TOLERANCE0. 0+0. 05)
H=100mm (TOLERANCE0. 0+0. 05) <BR>
</CENTER>
</BODY>
END
  (----START 1st PROCESS----)
G0Z200. X120. Y120.
T1
M6
T2
G15H1
S300M3
G0X0. Y0.
M8
G56Z0. 125H1
  .
  .
  .
G0Z200. X120. Y120.
  (----END 1st PROCESS----)
URL= "NAME:///CHECK_SIZE"
BROWSE
M0
  (----START 2nd PROCESS----)
M6
M63
S300M3
G0X0. Y0.
M8
G56Z0. 125H1
  .
  .
  .
G0Z200. X120. Y120.
  (----END 2nd PROCESS----)
M6
M2
```

— A (lines from O1000 through END)
— B (URL line)
— C (BROWSE line)

```
O1000
URL="http://www.server/today/cover_103.htm"
                                                                    A
BROWSE ............................................................ B
M0
 (---START 1st PROCESS---)
G0Z200. X120. Y120.
T1
M6
T2
G15H1
S300M3
G0X0. Y0.
M8
G56Z0. 125H1
   .
   .
   .
G0Z200. X120. Y120.
 (---END 1st PROCESS---)
 (---START 2nd PROCESS---)
M6
M63
S300M3
G0X0. Y0.
M8
G56Z0. 125H1
   .
   .
   .
G0Z200. X120. Y120.
 (---END 2nd PROCESS---)
M6
M2
```

NUMERICAL CONTROL SYSTEM

BACKGROUND OF THE INVENTION

1. Field of the Invention

The present invention relates to a numerical control system for reading numerical control information and executing a command described in the numerical control information, to a numerical control information creating system for creating the numerical control information to be read by the numerical control system, and to a numerical control information editing system for editing the numerical control information to be read by the numerical control system.

2. Description of the Related Art

It is usually necessary for an operator of a machining tool equipped with a numerical control system to confirm various set data. For example, before beginning operation, it is necessary to check the quantity, term of delivery, availability of material, data of the machining tool to be used, and the shape of machining. During and after operation, it is necessary to check the machining dimensions.

Utilizing various functions prepared on the numerical control system, the operator confirms the setting of these data before machining is begun. Although many numerical control system and machine manufacturers have made various attempts to facilitate confirming the data setting, all of these efforts have been directed towards general-purpose systems for all machine operators and all machining situations. No effort has produced a dedicated system designed for an individual operator or for any individual machining situation. However, it would be preferable to prepare an optimum screen display and functions matching the individual operator and the machining situation by only specifying the numerical control information to be used for the machining. Of course some conventional numerical control systems have means enabling the user to create a desired screen and then display or execute that screen according to a given numerical control command. However, since such conventional means have only complex fixed functions as originally individual by the system designer, it is impossible for systems to improve the performance.

SUMMARY OF THE INVENTION

It is therefore an object of the present invention to provide a numerical control system which can realize an optimized screen display and optimized functionality for an individual operator having a wide capability to express each of various machining situations by only specifying numerical control information to be used for machining. Such a system can also simply create such an optimized display and function through user commands, and such optimized display and functions are easy to utilize.

In order to accomplish the above object, the present invention employs hypertext similar to that widely used on the World Wide Web (WWW). A hypertext document is a document provided using this data providing method. On the World Wide Web, data is distributed by making it available in hypertext form, which expresses display format, figures, links to another hypertext, etc. when the embedded hypertext is viewed with a browser. Software itself may also be distributed over the Internet and executed by the browser. The most popular format for writing hypertext today is Hypertext Markup Language (HTML), though a number of new formats have been proposed.

According to a first aspect of the present invention, a numerical control system comprises means for specifying a hypertext document, which is adapted to at least enable designation of display format by a predetermined string of characters, insertion of a figure, linking to another hypertext, etc., in accordance with a command embedded in given numerical control information, and means for starting a browser function which reads the specified hypertext document to display or execute the contents of the hypertext document in accordance with the embedded command.

According to a second aspect of the present invention, a numerical control system comprises means for specifying a hypertext document in accordance with a command embedded in given numerical control information, and means responsive to the command, which is embedded in the numerical control information for designating display or execution of the hypertext to cause an operational browser function to read the specified hypertext and display or execute the hypertext as instructed by the command.

As a specific feature, various data may be given to a browser in accordance with the command described in the numerical control information.

As another specific feature, information from a browser may be reflected on execution of the numerical control information in accordance with the command described in the numerical control information.

According to a third aspect of the present invention, a numerical control information creating and editing system comprises means for selecting previously written hypertext, and means for incorporating into the numerical control information a command specifying the selected hypertext. When creating or editing numerical control information by these means, the system can incorporate into the numerical control information a command specifying the hypertext in a simple manner.

According to a fourth aspect of the present invention, a numerical control information creating and editing system comprises means for writing hypertext, and means for incorporating into the numerical control information a command specifying the hypertext. When creating or editing numerical control information by these means, the system can incorporate into the numerical control information a command specifying the hypertext in a simple manner.

As a specific feature, the system may further comprise means for incorporating into the numerical control information a command for providing various data to a browser when the hypertext must be displayed or executed by the browser.

As another specific feature, the system may further comprise means for incorporating into the numerical control information a command for mirroring data from a browser on execution of the numerical control information when the data from the browser is to be mirrored on execution of the numerical control information after the hypertext has been displayed or executed.

With the above arrangement, it is possible to use both a hypertext document, which is highly expressive and can be created by a variety of tools, and a browser function, which displays or executes the hypertext, as a unit with given numerical control information. Specifically, by specifying only the numerical control information to be used in machining, it is possible to realize displaying operations and functions optimal to the individual operators, comfortably in a sophisticated form.

Further, it is possible to provide a browser with necessary data collected or calculated in response to a command of given numerical control information so that the operator of the machining tool can consult with the data on the browser, and the data calculated in the browser or acquired by the browser through the network can be mirrored on execution of the numerical control information.

This means that, by specifying only information control information to be used in machining, it is possible to realize displaying operations and functions optimized for each individual operator or machining content, to achieve this comfortably in a sophisticated form, and for operators of any level of experience to realize the result of display and functioning on execution of the numerical control information.

BRIEF DESCRIPTION OF THE DRAWINGS

FIG. 6 shows one example of hypertext specified in the numerical control information of FIG. 5;

DETAILED DESCRIPTION OF THE PREFERRED EMBODIMENTS

The principles of the present invention are particularly useful when embodied in a numerical control system, in a numerical control information creating system, and a in numerical control information editing system. Various preferred embodiments of these will now be described in detail with reference to the accompanying drawings.

A data providing supernetwork known as the "WWW (World-Wide Web)" in which hypertext documents are made available through a system of networks and the distributed hypertext may be consulted using a browser is as popular means for providing data over the Internet. In the WWW, hypertext documents are published which include features such as designation of display format by a predetermined string of characters, insertion of figures, links to other hypertext, etc.

Hypertext is used for an increasing number of purposes, namely, not only for providing data through a network, but also for various functions of game software, spreadsheets, and word processing. Consequently, functions to be defined by hypertext and browser functions to display or execute hypertext are qualified at a definitely high level and are continue to be improved. Further, hypertext creation software tools, some very sophisticated and user-friendly, are becoming available in increasingly widening selection.

For hypertext, the HTML format is now the most popular among a variety of formats now in use, though new formats have been proposed.

According to the concept of the present invention, since a hypertext document specified by a command described in given numerical control information can be displayed or executed by a browser function based on the designation of the command in the numerical control information, it is possible to utilize hypertext, which is highly expressive and can have an excellent function, and a browser, as a unit for numerical control information. It will also become possible to incorporate with the numerical control information a command for specifying hypertext and designating display or execution of the specified hypertext by the browser.

Embodiment 1

Figure 1:
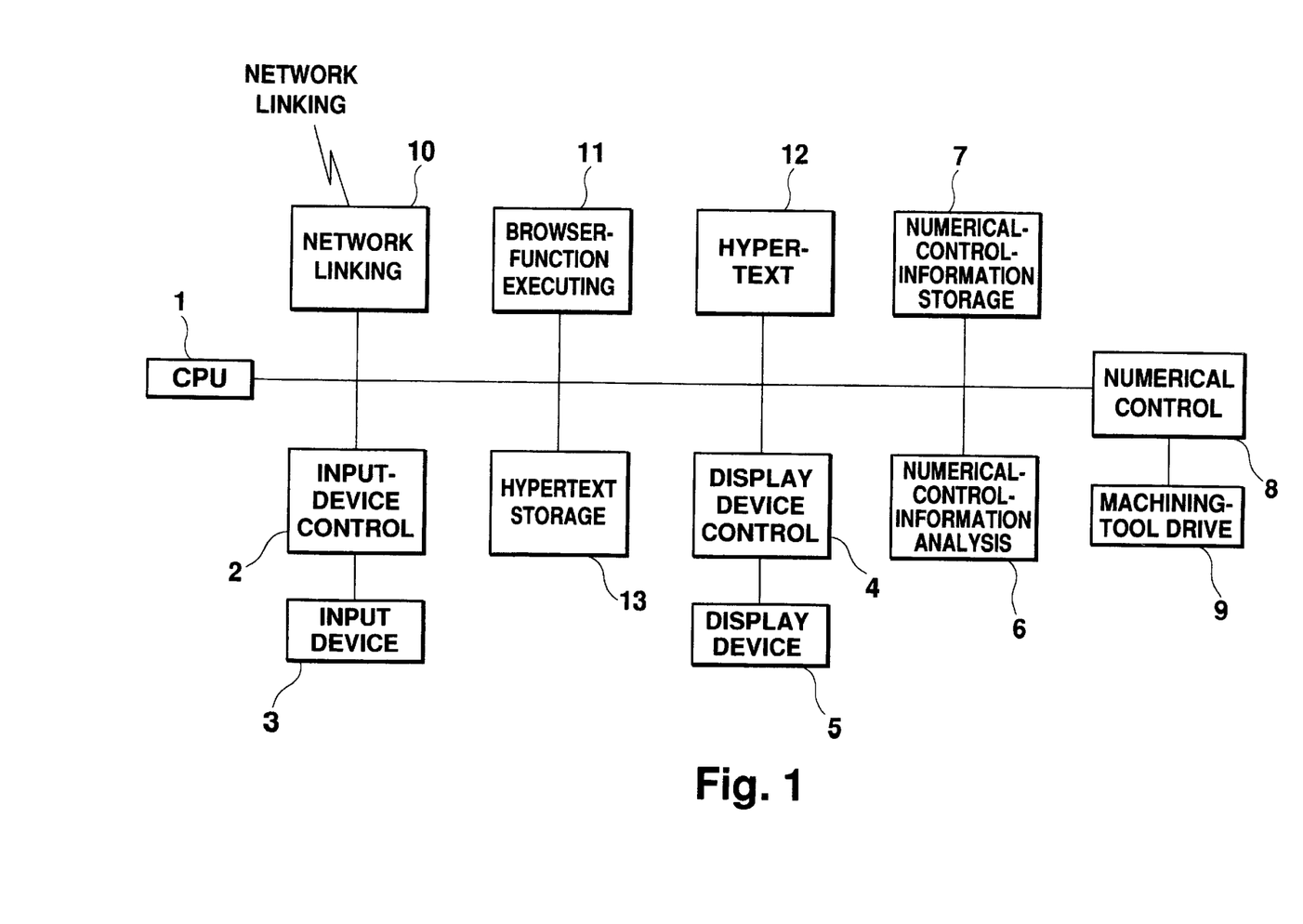
FIG. 1 is a block diagram showing a numerical control system according to the present invention.

FIG. 1 is a block diagram showing one example of a numerical control system of the present invention. This numerical control system comprises, as basic elements similar to like those of a conventional system, a CPU 1, an input-device control section 2, a display-device control section 4, a numerical-control-information analysis section 6, a numerical-control-information storage section 7, a numerical control section 8, an input device 3 connected to the input-device control section 2, a display device 5 connected to the display-device control section 4, and a machining-tool drive section 9 connected to the numerical control section 8, which are interconnected by a bus line. A network linking section 10 is connected to the bus line as needed, like in the conventional system. For numerical control information in which no commands including hypertext and no commands designating launching a browser are described, these individual sections act under the control of the CPU 1 to execute a string of commands in the numerical control information successively. First, the numerical control information is input to the numerical control system via the input device 3, which is controlled by the input-device control section 2, and the network linking section 10, and is then stored in the numerical-control-information storage section 7. Each command in the stored numerical control information is analyzed by the numerical-control-information analysis section 6, and the numerical control section 8 controls the operation of a machining tool based on the contents of the command via the machining-tool drive section 9.

In the numerical control system of the present invention, a browser-function executing section 11 and a hypertext specifying section 12 are added. If the hypertext should be stored in the numerical control system, a hypertext storage section 13 may be added; however, this storage section is not an indispensable element of the present invention. Also in numerical control information in which a command specifying hypertext, a command designating display or execution of the specified hypertext, a command giving data to the browser, and a command mirroring data of the browser on execution of the numerical control information are described, the remaining commands are processed in the same manner as in the conventional numerical control system.

After the command specifying the hypertext has been analyzed by the numerical-control-information analysis section 6, the contents of the command is transmitted to the hypertext specifying section 12 where the hypertext is specified. At that time, the hypertext to be specified may be present in the hypertext storage section 13, or maybe described in the numerical control information, or may be stored in another computer or numerical control system through the network linking section 10.

Regarding the command designating display or execution of the specified hypertext, after it has been analyzed by the numerical-control-information analysis section 6, this command is designated by the browser-function executing section 11. The browser-function executing section 11 executes various processes based on the hypertext specified by the hypertext specifying section 12 to display an intended image on the display device 5 via the display-device control section 4. At that time, if the browser function is not started, the browser function must be started before executing various processes.

Also, after the command giving data to the browser has been analyzed by the numerical-control-information analysis section 6, the data is given to the browser as transmitted to the browser-function executing section 11.

After the command mirroring the data from the browser on execution of the numerical control information has been analyzed by the numerical-control-information analysis section 6, necessary data is acquired from the browser by requesting the browser-function executing section 11 for the data, and the data is then mirrored on execution of the numerical control information.

The present invention should by no means be limited to the numerical control system of FIG. 1, and may be realized by various alternative examples.

Figure 2:
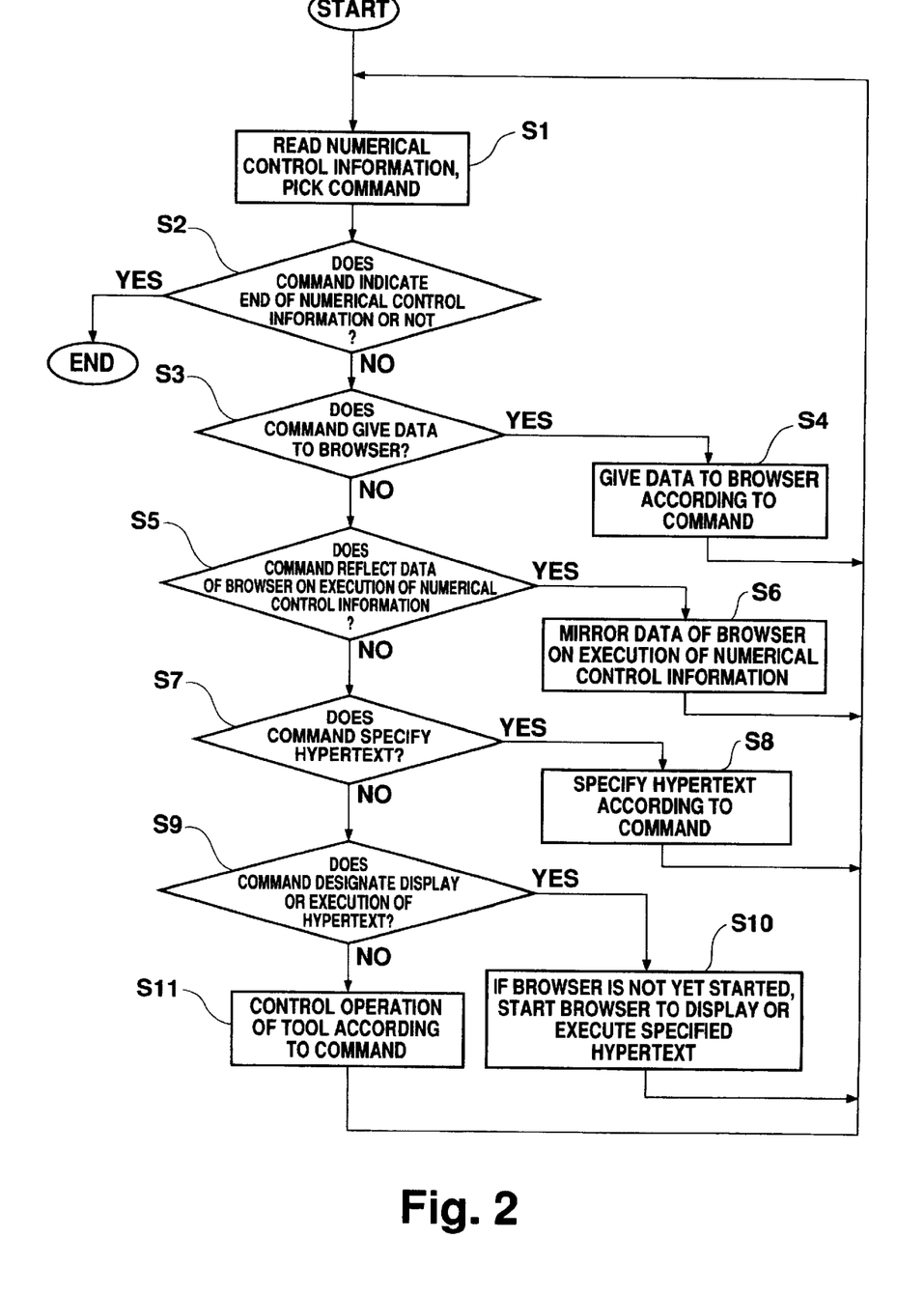
FIG. 2 is a flowchart illustrating the operating procedure of the numerical control system of FIG. 1.

FIG. 2 is a flowchart illustrating the operating procedure of the numerical control system of FIG. 1. In the numerical control system, the numerical control information input via the input device 3 controlled by the input-device control section 2 and by the network linking section 10 is then stored in the numerical-control-information storage section 7 and analyzed by the numerical-control-information analysis section 6 to pick out the command (step S1). A determination is made as to whether or not the picked command is a command indicating the end or termination of the numerical control information (step S2); if the result of step S2 is positive, the operating schedule will be terminated, while, if the result is negative, a determination is then made as to whether or not the command is a command giving data to the browser (step S3). If the result of step S3 is positive, the data is transmitted to the browser-function executing section 11 in accordance with the command to give the data to the browser (step S4). If the result is negative, then a determination is made as to whether or not the command is a command mirroring the data of browser on execution of the numerical control information (step S5). If the result of step S5 is positive, the data of the browser as acquired from the browser-function executing section 11 is mirrored on execution of the numerical control information in accordance with the command (step S6), and, if the result is negative, a determination is made as to whether the command is a command specifying the hypertext (step S7). If the result of step S7 is positive, the hypertext is specified in accordance with the command (step S8). At that time, the hypertext to be specified may be present in the hypertext storage section 13, or may be stored in another computer or numerical control system through the network linking section 10. If the result of step S7 is negative, a discrimination is made on whether the command is a command designating displaying or execution of the hypertext (step S9). If the result of step S9 is positive, the browser-function executing section 11 displays or executes the specified hypertext on the browser in accordance with the command (step S10). At that time, if the browser is not yet open, it must be launched before the hypertext may be displayed or executed. If the result of step S9 is negative, the operation of machining is controlled in accordance with the command via the machining-tool drive section a connected to the numerical control section 8 (step S11). After the process according to the respective command has been carried out, the operation scheme is returned to step S8 to continue the process until a command indicating the termination of the numerical control information will be chosen.

Embodiment 2

Figure 3:
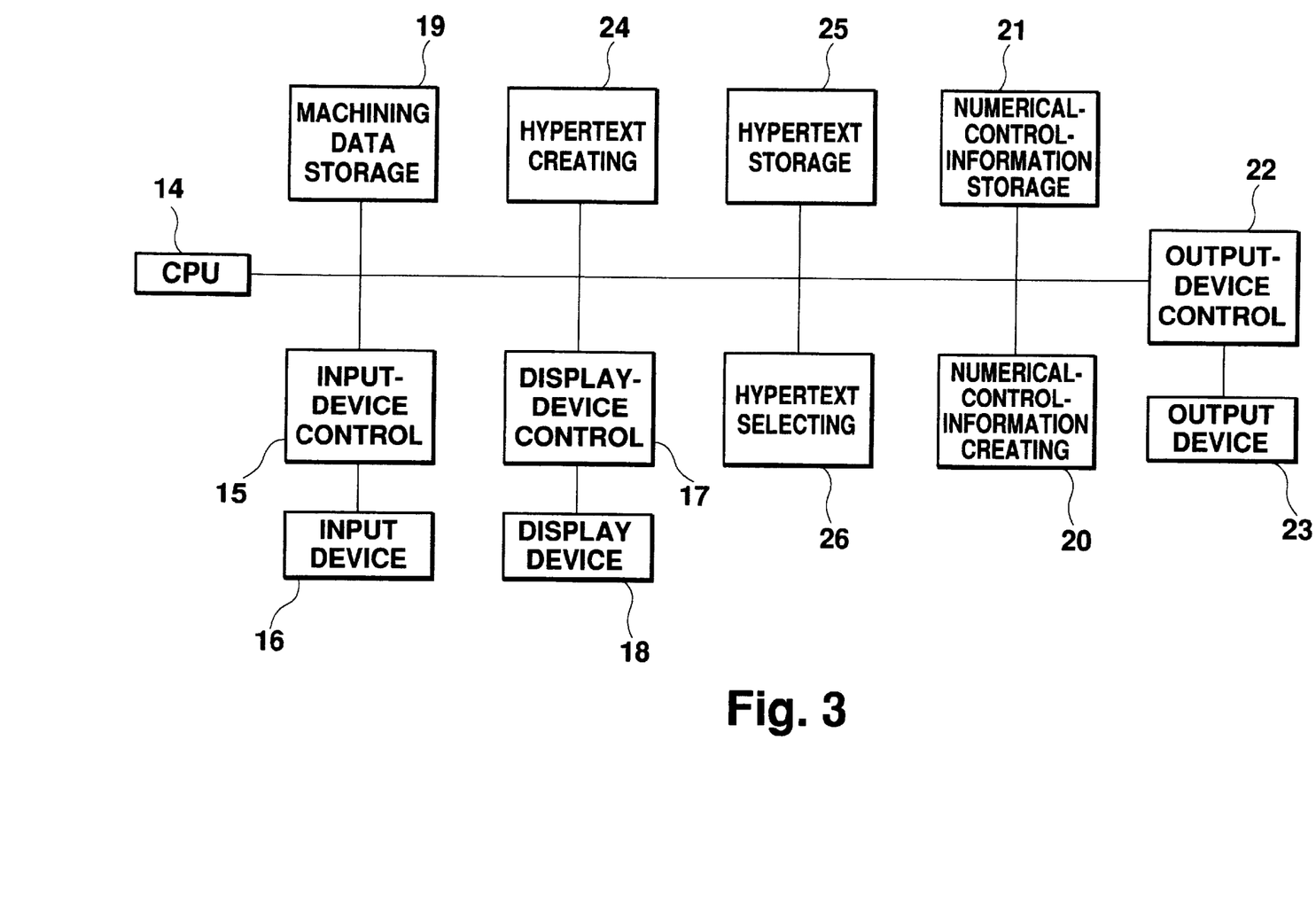
FIG. 3 is a block diagram of a numerical control information creating system according to the invention.

FIG. 3 is a block diagram showing one example of a numerical control information creating system according to the present invention. This numerical control information creating system comprises, as basic elements similar to those of a conventional system, a CPU 14, an input-device control section 15, a display-device control section 17, a machining-data storage section 19, a numerical-control-information creating section 20, a numerical-control-information storage section 21, an output-device control section 22, an input device 16 connected to the input-device control section 15, a display device 18 connected to the display-device control section 17, and an output device 23 connected to the output-device control section 22, which are interconnected by bus lines. Numerical control information in which no command specifying the hypertext or designating display or execution of hypertext is incorporated is created as these individual sections are activated under control of the CPU 14. First, to create numerical control information, an operator, while watching the screen display of the display device 18 connected to the display-device control section 17, inputs machining data with the input device 16, such as a keyboard or a mouse, connected to the input-device control section 15. The input machining data is temporarily stored in the machining-data storage section 19. The numerical-control-information creating section 20 creates numerical control information utilizing the machining data stored in the machining-data storage section 19 to store the created information in the numerical-control-information storage section 21. The stored numerical control information is output via the output device 23, such as a floppy disk, connected to the output-device control section 22.

In the numerical control information creating system of the present invention, a hypertext selecting section 26 selects a previously created hypertext and a hypertext creating section 24 creates new hypertext.

If the previously created hypertext and/or the newly created hypertext is to be stored, a hypertext storage section 25 should be added, but this does not constitute an indispensable element of the present invention.

In machining utilizing the created numerical control information, if hypertext is to be specified and the specified hypertext is to be displayed or executed, it is necessary to incorporate with the numerical control information a command specifying the hypertext and a command designating display or execution of the specified hypertext. When creating numerical control information using previously created hypertext, the operator operates the hypertext selecting section 26 via the input device 16 is connected to the input-device control section 15, to select for use a simple hypertext document from among various hypertext stored in the hypertext storage section 25. The numerical-control-information creating section 20 incorporates into the numerical control information a command specifying the selected hypertext and a command designating display or execution of the specified hypertext. If it is necessary to supply any of various types of data to the browser when the specified hypertext is displayed or executed, a command supplying such necessary data to the browser is incorporated in the numerical control information as part thereof. If the data from the browser must be mirrored on execution of the numerical control information after the specified hypertext has been displayed or executed by the browser function, a command mirroring the data from the browser on execution of the numerical control information is incorporated in the numerical control information. Hypertext itself may be incorporated in the numerical control information as necessary.

Further, to simultaneously create hypertext to be used and the numerical control information, the operator may, while watching the screen display of the display device 18 connected to the display-device control section 17, operate the hypertext creating section 24 via the input device 16 connected to the input-device control section 15 to create new hypertext. The numerical-control-information creating section 20 incorporates into the numerical control information a command specifying the created hypertext and a command designating displaying and execution of the specified hypertext as part of the information. If one or more among various types of data must be given to the browser when the specified hypertext is displayed or executed, a command to give such necessary data to the browser is incorporated in the numerical control information. If the data from the browser must be mirrored on execution of the numerical control information after the specified hypertext has been displayed or executed by the browser function, a command mirroring the data from the browser on execution of the numerical control information. In the meantime, in machining using the created numerical control information, the created hypertext itself may be incorporated in the numerical control information, output via the output device 23 connected to the output-device control section 22, or stored in a server computer to be readable by the browser.

The present invention should by no means be limited to the numerical control information creating system of FIG. 3 and may be realized in various alternative forms.

Embodiment 3

Figure 4:
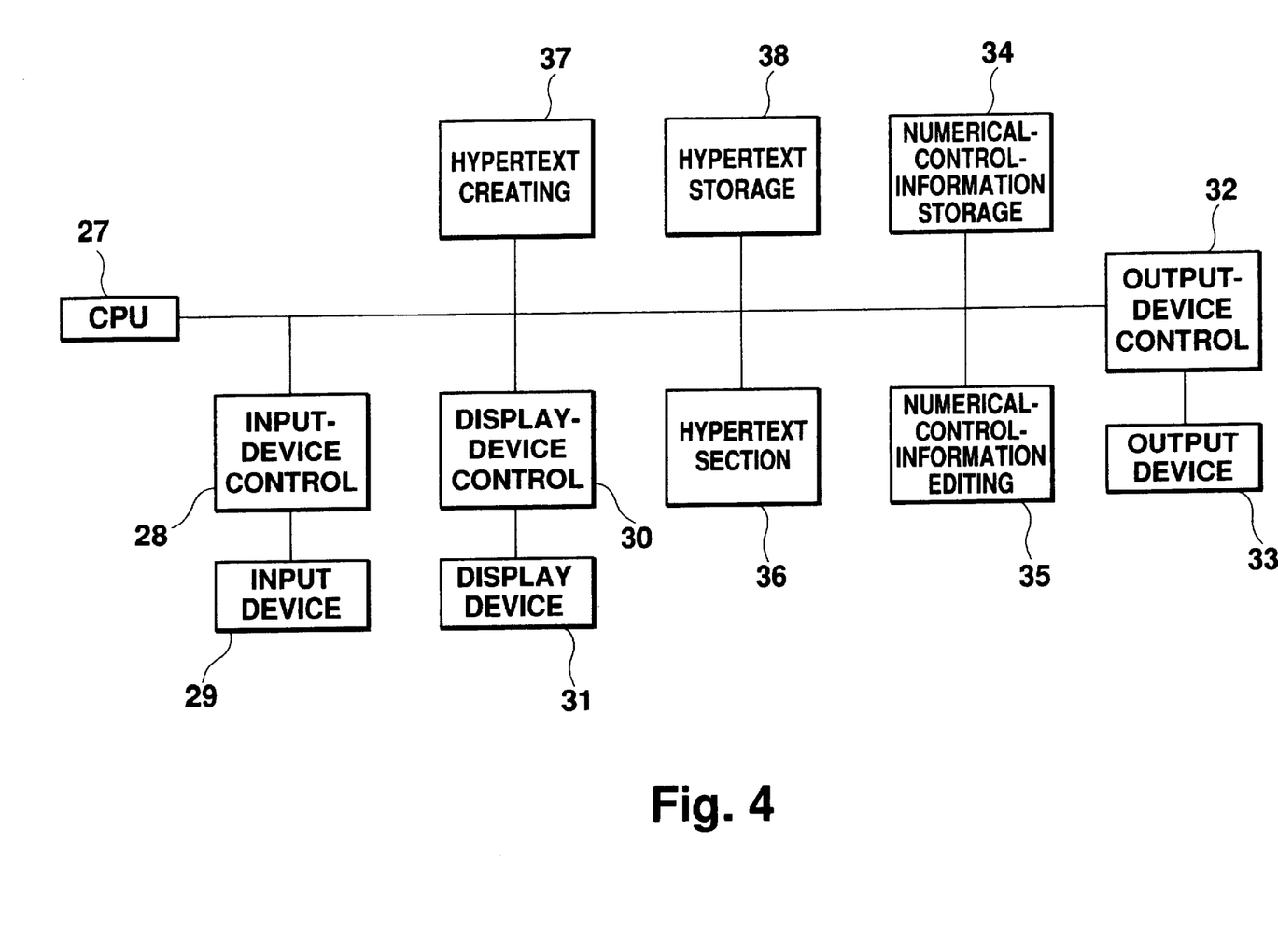
FIG. 4 is a block diagram of a numerical control information editing system according to the invention.

FIG. 4 is a block diagram of a numerical control information editing system according to the present invention. This numerical control information editing system comprises, as basic elements similar to those of a conventional system, a CPU 27, an input-device control section 28, a display-device control section 30, a numerical-control-information editing section 35, a numerical-control-information storage section 34, an output-device control section 32, an input device 29 connected to the input-device control section 28, a display device 31 connected to the display-device control section 30, and an output device 33 connected to the output-device control section 32, which are interconnected by a bus line. Numerical control information in which no command specifying hypertext or designating display or execution of hypertext is incorporated is edited as these individual sections are operated under the control of the CPU 27. First, for editing the numerical control information, while observing the screen display of the display device 31 connected to the display-device control section 30, the operator operates the numerical-control-information editing section 35 via the input device 29, such as a keyboard or a mouse, connected to the input-device control section 28 to edit the numerical control information stored in the numerical-control-information storage section 34. Upon completion of editing, the numerical control information is output to the outside via the output device 33 connected to the output-device control section 32 such as a floppy disk device.

In the numerical control information editing system of the present invention, a hypertext selecting section 36 selects previously created hypertext, while a hypertext creating section 37 creates new hypertext.

If the previously created hypertext and/or the created hypertext must be stored, a hypertext storage section 38 must be added, though this section does not constitute an indispensable element of the present invention.

In machining using the edited numerical control information, if hypertext is to be specified and the specified hypertext is to be displayed or executed, it is necessary to incorporate with the numerical control information a command specifying the hypertext and a command designating display or execution of the specified hypertext. If numerical control information is to be created using previously created hypertext, the operator operates the hypertext selecting section 36 via the input device 29 connected to the input-device control section 28 to select the hypertext to be used. The numerical-control-information editing section 35 incorporates into the numerical control information as a part thereof a command specifying the selected hypertext and a command designating display or execution of the specified hypertext. If any of various types of data must be supplied to the browser when the specified hypertext is displayed or executed, the numerical-control-information editing section 35 incorporates into the numerical control information a command supplying the required data to the browser. Further, if it is necessary to mirror data from the browser on execution of the numerical control information after the specified hypertext has been displayed or executed by a browser function, the numerical-control-information editing section 35 incorporates into the numerical control information a command mirroring data from the browser on execution of the numerical control information. The hypertext itself may be incorporated in the numerical control information as demanded.

When the hypertext to be used is to be created simultaneously with the numerical control information, the operator, while observing the screen display of the display device 31 connected to the display-device control section 30, operates the hypertext creating section 37 via the input-device 29 which is connected to the input-device control section 28 to create the hypertext. The numerical-control-information editing section 35 incorporated with the numerical control information as a part thereof a command specifying the created hypertext and a command designating displaying or execution of the specified hypertext. If any of various kinds of data must be given to the browser when the specified hypertext is displayed or executed, the numerical-control-information editing section 35 incorporates into the numerical control information a command giving the needed data to the browser. Further, if it is necessary to mirror data from the browser on execution of the numerical control information after the specified hypertext has been displayed or executed by a browser function, the numerical-control-information editing section 35 incorporates into the numerical control information a command mirroring data from the browser on execution of the numerical control information. On the other hand, when machining using the created numerical control information, the created hypertext itself is incorporated in the numerical control information, output via the output-device 33 connected to the output-device control section 32, or stored in the numerical control system itself or in a server computer, so that it may be read by the browser.

The numerical control information editing system of the present invention should by no means be limited to the example of FIG. 4 and may be realized by various alternative arrangements.

Embodiment 4

Figure 5:
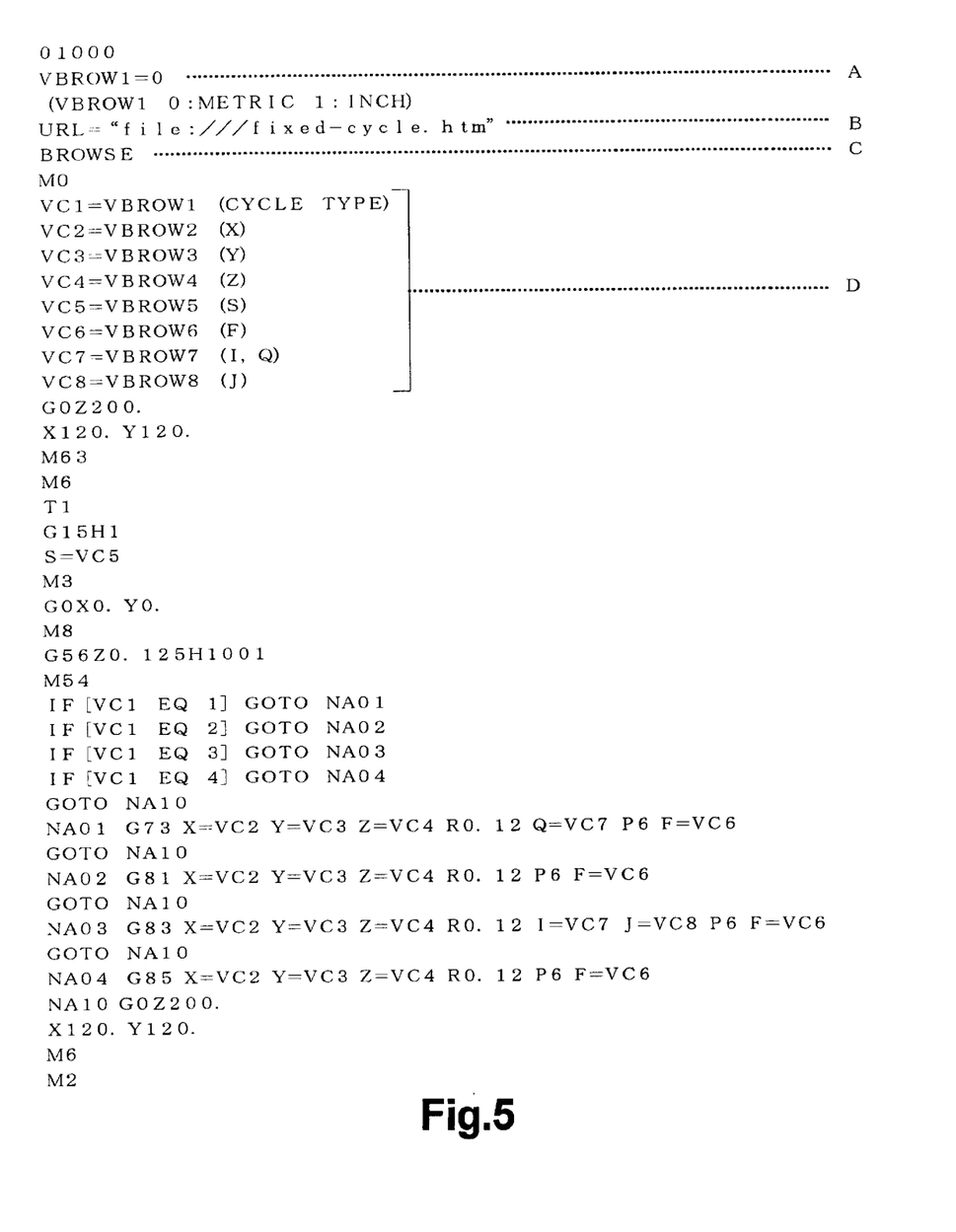
FIG. 5 shows one example of numerical control information in which a command specifying hypertext and a command designating starting of a browser are described.
Figure 7:
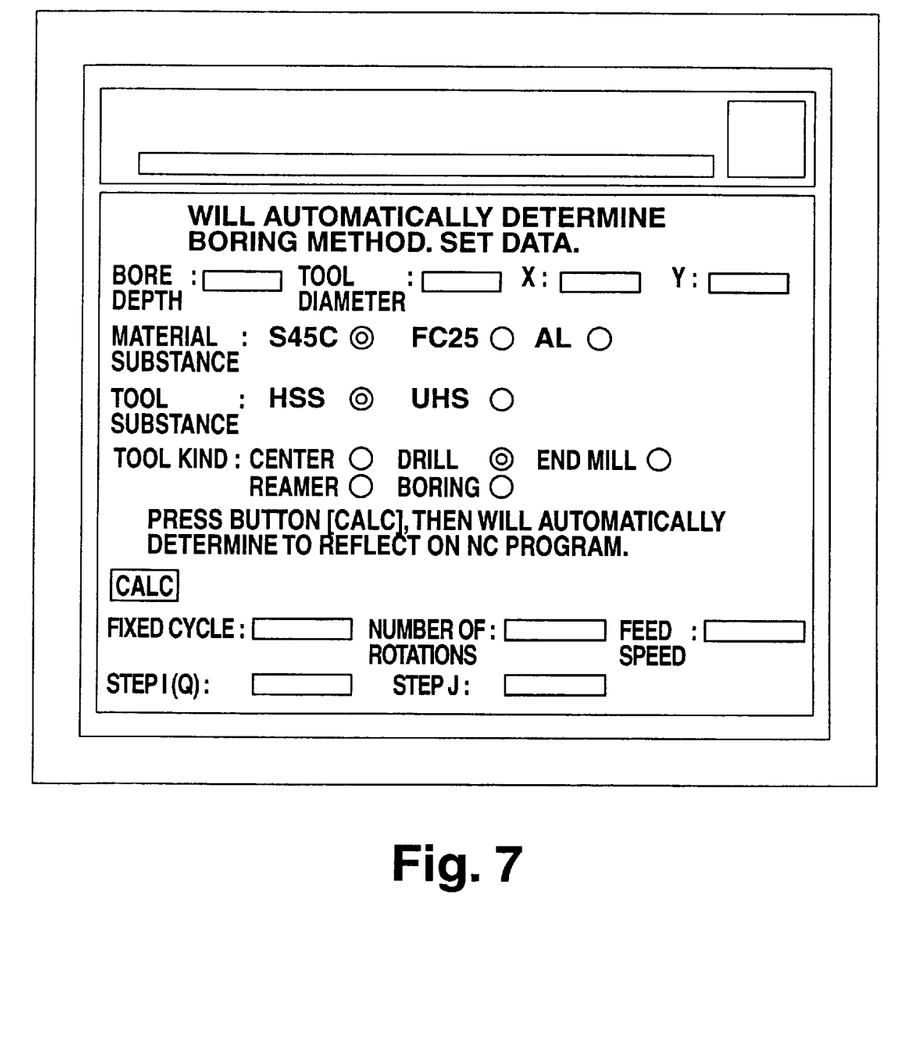
FIG. 7 is a diagram showing one example of screen display when the browser has been started in accordance with the hypertext of FIG. 6.

FIG. 5 shows one example of numerical control information in which a command specifying certain hypertext and a command designating display or execution of the hypertext are described. The command indicated by symbol A is a command for giving data to the browser. If a variable VBROW1 is set to 0 and hypertext is displayed on the browser, this value is used. A command indicated by symbol B is a command for specifying hypertext; this command specifies hypertext by designating a file name of the file the numerical control system possesses including the hypertext. The content of the specified hypertext is shown in FIG. 6. By this command, the hypertext specified by the command indicated by symbol B is displayed or executed on the browser. At that time, if the browser is not yet operational, the browser must be launched before the hypertext is displayed or executed. This mode of display is illustrated in FIG. 7. Specifically, the display shows a data input column where a fixed cycle and a cutting condition for boring are to be determined and a display column where calculated data is to be displayed. A command indicated by symbol D reflects a value calculated by the browser on execution of the numerical control information. This reflected value is used as the kind of fixed cycle or cutting condition for boring.

In FIG. 7, a simple example in which a fixed cycle and cutting condition for boring are to be determined is illustrated. By utilizing hypertext and a browser for display the hypertext, it is possible for an operator to create a highly functional screen display. Further, if hypertext to be specified by a command in the numerical control information is to be created, the hypertext is created using the best fitting tool from the very wide selection of tools for creating a hypertext that are available, whereupon selection may be made in the numerical control information creating system or the numerical control information editing system. Also, if hypertext is to be created during creating or editing of the numerical control information, the optimum available tool for creating hypertext is first incorporated in the numerical control information system or the numerical control information editing system. In the conventional art, when it is desired that such function be realized on a screen using a command in the numerical control information, the only available method is to utilize a packaged function in the numerical control system, originally designed by the numerical-control-system maker, such as the numerical control information creating system or the numerical control information editing system. Since such packaged tools are intended for only a limited market, i.e., numerical control systems, they are particularly limited in expressivity and function and contain only a limited number of hypertext creating tools. Considerable labor is required in such systems to realize an acceptable level of functionality.

Figure 8:
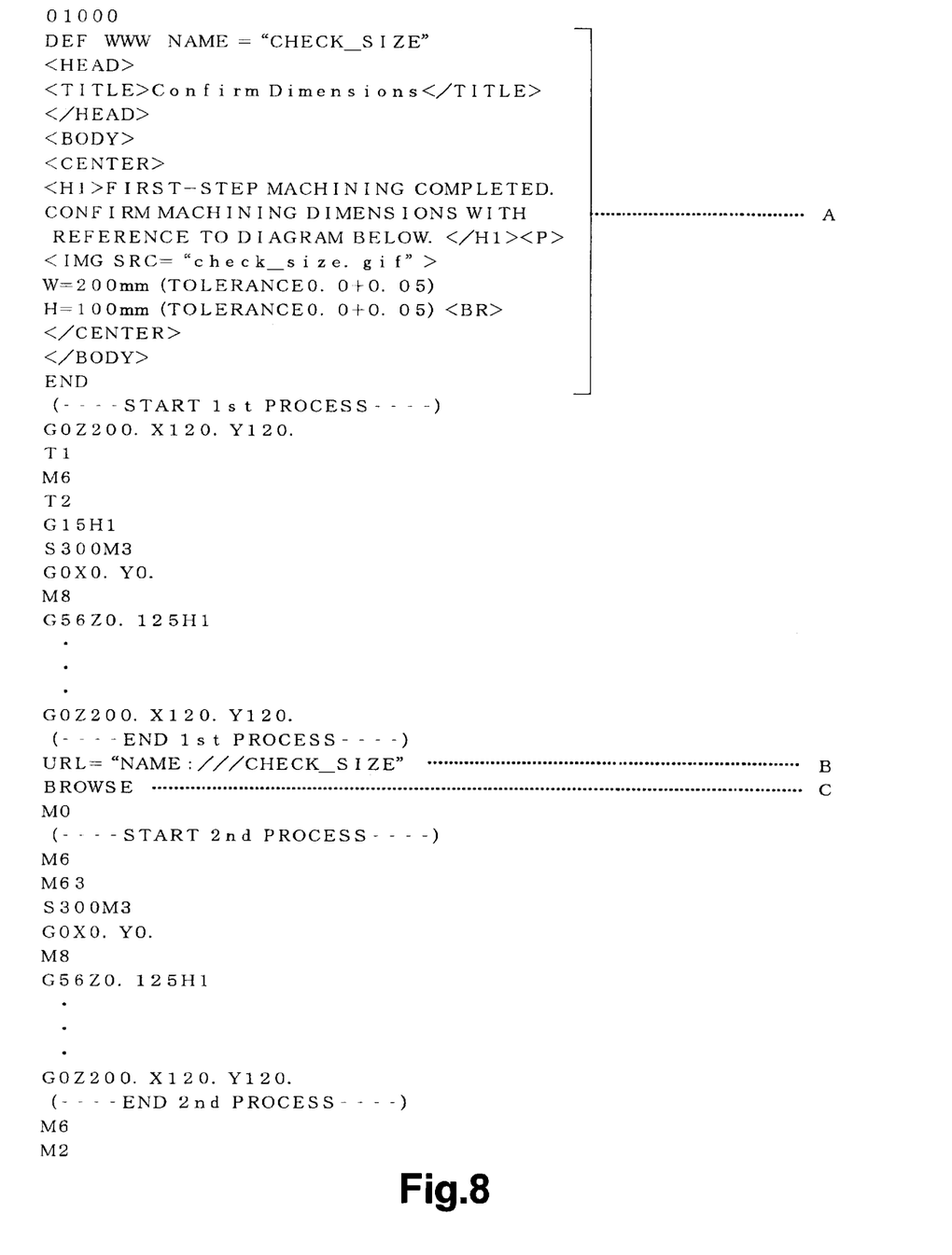
FIG. 8 shows another example of numerical control information in which a command specifying hypertext and a command designating starting of a browser are described.
Figure 9:
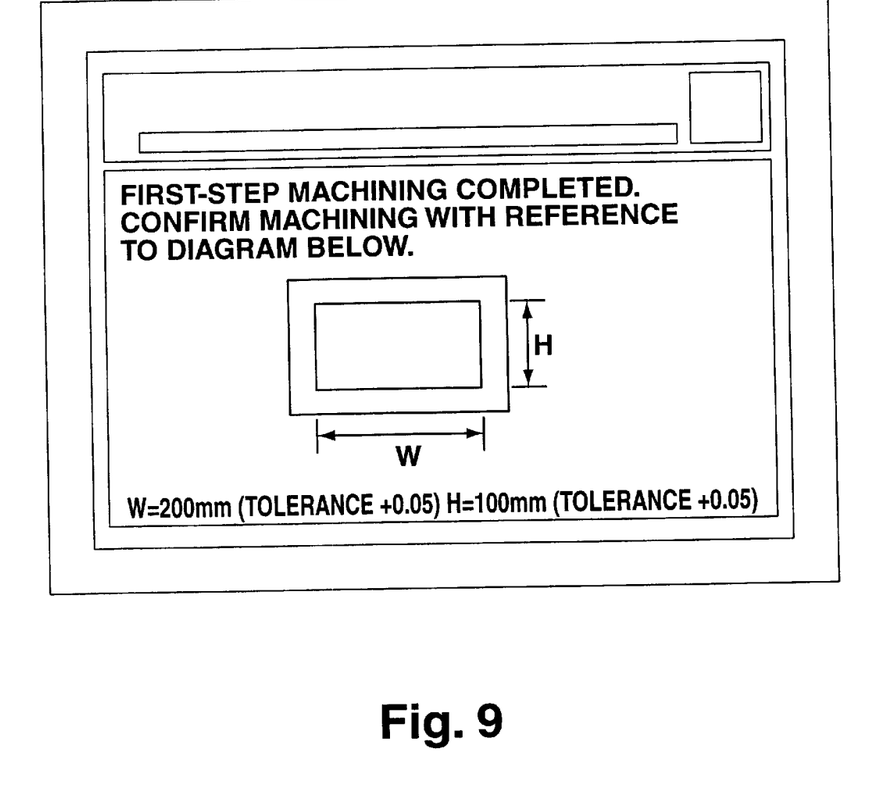
FIG. 9 is a diagram showing one example of screen display when the browser has been started in accordance with the hypertext specified in the numerical control information of FIG. 8.

FIG. 8 shows another example of numerical control information in which a command specifying hypertext and a command designating display or execution of the hypertext are described. In this example, as indicated by symbol A, hypertext is described in the numerical control information. The portion indicated by symbol B specifies the hypertext and, in the portion indicated by symbol C, the WWW hypertext specified by the command indicated by symbol B is displayed on the browser. At that time, if the browser is not yet operational, it must first be launched before the hypertext can be displayed. This mode of display is illustrated in FIG. 9, which shows a schematic view of work to be machined, asking for confirmation of the dimensions of the illustrated part of the work. By utilizing hypertext and the high expressivity and functionality of the browser for displaying the hypertext, and by using various commercially available tools for creating hypertext or by using such tools as incorporated in the numerical control information creating system or numerical control information editing system, such a display can easily be realized. In the conventional art, for realizing even a simple screen display by a command in the numerical control system, a packaged function on the numerical control system originally designed for a fixed purpose by the numerical control system manufacturer must be used.

Figure 10:
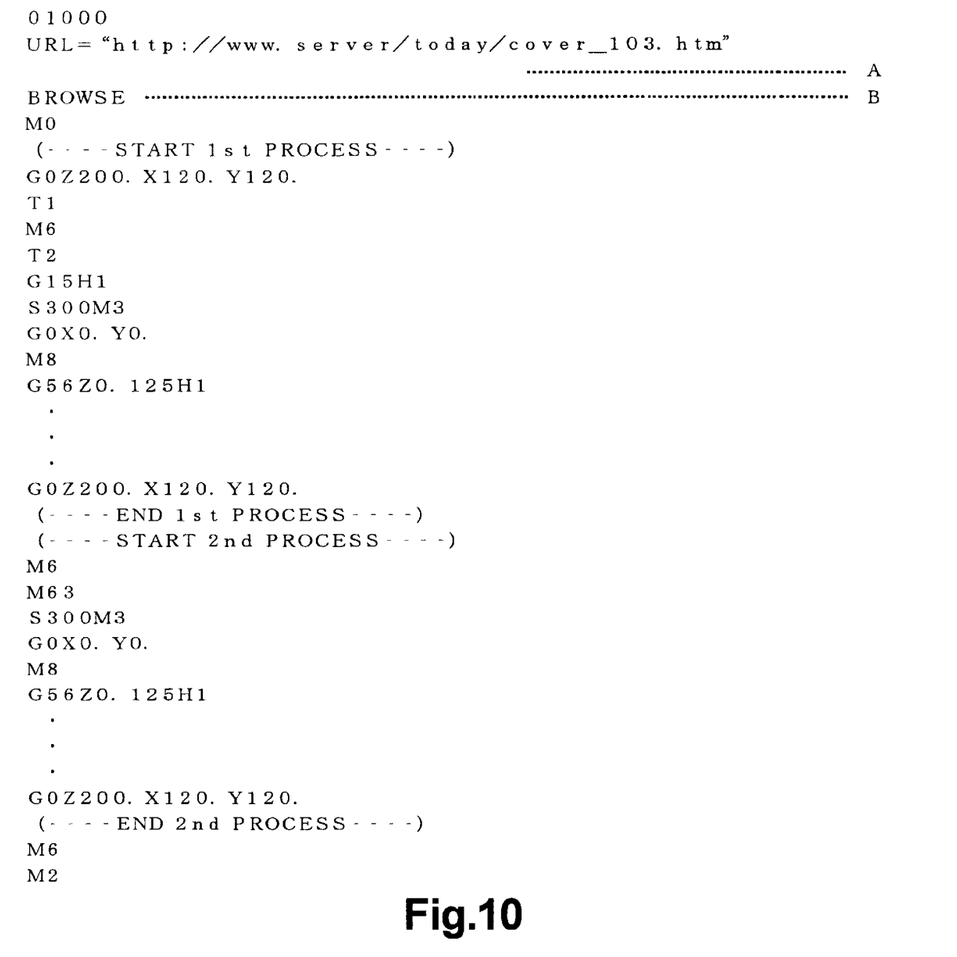
FIG. 10 shows still another example of numerical control information in which a command specifying hypertext and a command designating starting of a browser are described.
Figure 11:
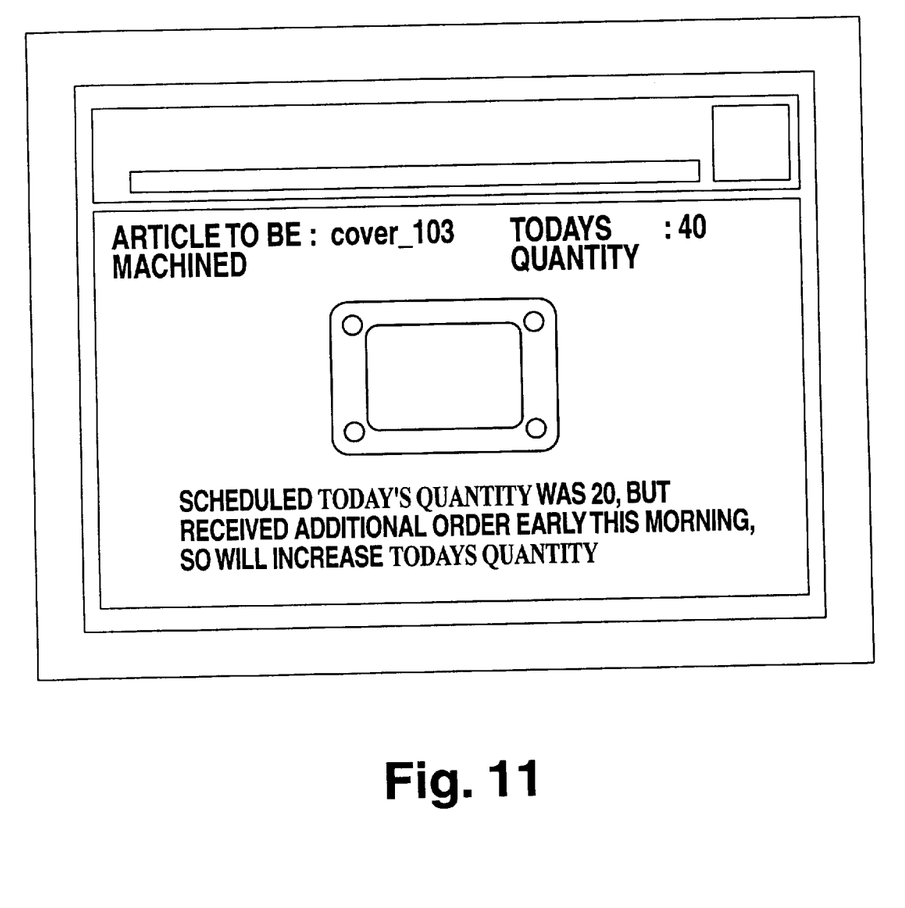
FIG. 11 is a diagram showing one example of screen display when the browser has been started in accordance with the hypertext specified in the numerical control information of FIG. 10.

FIG. 10 shows still another example of numerical control information in which a command specifying hypertext and a command designating display or execution of the hypertext are described. A command indicated by symbol A specifies hypertext in a server computer via the network, and the hypertext specified by a command indicated by symbol B is displayed on the browser. Of course, the browser must first be launched to indicate the hypertext. This mode of display is illustrated in FIG. 11, in which the number of products to be machined for that date is designated. As the hypertext in the server computer is a command in the numerical control information and as designation is made by that command so as to start the browser, the hypertext will be displayed on the browser only by specifying the numerical control information and starting the operation and at the operation can obtain the information necessary for machining from the server computer without meticulous operations of consulting another computer. Particularly in this example, by referring to data from the server computer, it is possible to provide necessary information in real time. In the conventional system, if such function is to be realized on the screen display by a command in the numerical control information, it could only have been realized by utilization of a packaged function originally designed by the individual numerical control system manufacturer for a dedicated purpose. Further, in a conventional system the server computer must have a dedicated function corresponding to the packaged function originally designed by the numerical control system manufacturer. Since such conventional functions are designed only for limited customers, the level of expressivity and performance do not match the increasing demands of many other customers. Further, although in the numerical control system, necessary data could be referred from the server computer by launching the browser on the numerical control system hypertext can not be specified only by specifying the numerical control information until the operator confirms by written communication, E-mail, oral (over telephone), etc. as to which hypertext is to be referred. The operator must then take various actions on the browser to meet the confirmed contents. This process is not only laborious and time-consuming, but also creates a great possibility for inadvertent errors during consultation of data.

What is claimed is:

1. A numerical control system that reads given numerical control information and executes a command described in the numerical control information, comprising:
   (a) a device that specifies hypertext in accordance with a command described in the numerical control information; and
   (b) a device, responsive to a command instructing at least one of display of said hypertext and execution of said hypertext, that launches a browser tool to perform at least one of reading said hypertext, displaying said hypertext, and executing said hypertext.

2. A numerical control system according to claim 1, further comprising a device that supplies various data to the browser tool in accordance with said command described in the numerical control information.

3. A numerical control system according to claim 1, further comprising a device that mirrors data being processed by the browser tool on execution of the numerical control information described in the numerical control information.

4. A numerical control system that reads given numerical control information and executes a command described in the numerical control information, comprising:
(a) a device that specifies hypertext in accordance with a command described in the numerical control information; and
(b) a device responsive to a command instructing displaying or execution of said hypertext, that causes a previously launched browser tool to perform at least one of reading said hypertext, displaying said hypertext, and executing said hypertext.

5. A numerical control system according to claim 4, further comprising a device that supplies various data to the browser tool in accordance with said command described in the numerical control information.

6. A numerical control system according to claim 4, further comprising a device that mirrors data being processed by the browser tool on execution of the numerical control information described in the numerical control information.

7. A numerical control information creating system that creates numerical control information in accordance with input data necessary for machining, comprising:
(a) a device that selects previously created hypertext;
(b) a device that incorporates into the numerical control information a command specifying said selected hypertext; and
(c) a device that incorporates into the numerical control information a command to supply to a browser tool data necessary for said browser tool to display or execute said hypertext.

8. A numerical control information creating system that creates numerical control information in accordance with input data necessary for machining, comprising:
(a) a device that creates hypertext;
(b) a device that incorporates into the numerical control information a command specifying the created hypertext; and
(c) a device that incorporates into the numerical control information a command to supply to a browser tool data necessary for said browser tool to display or execute said hypertext.

9. A numerical control information creating system that creates numerical control information in accordance with input data necessary for machining, comprising:
(a) a device that selects previously created hypertext;
(b) a device that incorporates into the numerical control information a command specifying said selected hypertext; and
(c) a device that incorporates into the numerical control information a command to mirror data from a browser tool on execution of the numerical control information when said data must be reflected on execution of the numerical control information, after said hypertext has been displayed or executed by the browser tool.

10. A numerical control information creating system that creates numerical control information in accordance with input data necessary for machining, comprising:
(a) a device that creates hypertext;
(b) a device that incorporates into the numerical control information a command specifying the created hypertext; and
(c) a device that incorporates into the numerical control information a command to mirror data from a browser tool on execution of the numerical control information when said data must be reflected on execution of the numerical control information, after said hypertext has been displayed or executed by the browser tool.

11. A numerical control information editing system that edits given numerical control information to create new numerical control information to be used for machining, comprising:
(a) a device that selects previously created hypertext;
(b) a device that incorporates into the numerical control information a command specifying said selected hypertext; and
(c) a device that incorporates into the numerical control information a command to supply to a browser tool data necessary for said browser tool to display or execute said hypertext.

12. A numerical control information editing system that edits numerical control information to create new numerical control information to be used for machining, comprising:
(a) a device that creates hypertext;
(b) a device that incorporates into the numerical control information a command specifying said created hypertext; and
(c) a device that incorporates into the numerical control information a command to supply to a browser tool data necessary for said browser tool to display or execute said hypertext.

13. A numerical control information editing system that edits given numerical control information to create new numerical control information to be used for machining, comprising:
(a) a device that selects previously created hypertext:
(b) a device that incorporates into the numerical control information a command specifying said selected hypertext; and
(c) a device that incorporates into the numerical control information a command to mirror data from a browser tool on execution of the numerical control information when said data must be reflected on execution of the numerical control information, after said hypertext has been displayed or executed by the browser tool.

14. A numerical control information editing system that edits numerical control information to create new numerical control information to be used for machining, comprising:
(a) a device that creates hypertext;
(b) a device that incorporates into the numerical control information a command specifying said created hypertext; and
(c) a device that incorporates into the numerical control information a command to mirror data from a browser tool on execution of the numerical control information when said data must be reflected on execution of the numerical control information, after said hypertext has been displayed or executed by the browser tool.

* * * * *